(12) United States Patent
Xiong et al.

(10) Patent No.: US 9,494,242 B2
(45) Date of Patent: Nov. 15, 2016

(54) CONNECTING STRUCTURE FOR VACUUM SYSTEM

(71) Applicants: HONG FU JIN PRECISION INDUSTRY (ShenZhen) CO., LTD., Shenzhen (CN);
(Continued)

(72) Inventors: She Xiong, Shenzhen (CN); Bing Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 385 days.

(21) Appl. No.: 14/153,083

(22) Filed: Jan. 13, 2014

(65) Prior Publication Data
US 2014/0203546 A1   Jul. 24, 2014

(30) Foreign Application Priority Data

Jan. 24, 2013   (CN) .................. 2013 1 00267465

(51) Int. Cl.
| | | |
|---|---|---|
| *B25J 15/06* | (2006.01) | |
| *F16K 17/30* | (2006.01) | |
| *B65G 47/91* | (2006.01) | |

(52) U.S. Cl.
CPC ............ *F16K 17/30* (2013.01); *B25J 15/0616* (2013.01); *B65G 47/91* (2013.01)

(58) Field of Classification Search
CPC .......... F16K 17/22; F16K 17/28; F16K 17/04; F16K 17/30; F16L 17/06; F16L 17/00;
(Continued)

(56) References Cited

U.S. PATENT DOCUMENTS 2,404,924 A * 7/1946 Sacchini ................. F16K 17/30
137/493
2,749,937 A * 6/1956 Schramm ................ F16K 17/30
137/460
(Continued)

FOREIGN PATENT DOCUMENTS

| DE | EP 1484142 A1 * | 12/2004 | .......... B25J 15/0616 |
| JP | EP 0354559 A1 * | 2/1990 | .......... B21D 5/0281 |
| JP | WO 2006048959 A1 * | 5/2006 | .......... B25J 15/0616 |

*Primary Examiner* — Christine T Cajilig
(74) *Attorney, Agent, or Firm* — Zhigang Ma

(57) ABSTRACT

A connecting structure includes housing, a first fixing member, a second fixing member, a sealing member, and an elastic member. A stepped hole is defined on the housing, and includes a first vent, a second vent, and a third vent communicating with each other. A diameter of the second vent is gradually decreased from the first vent toward the third vent, thereby forming a resisting surface on a periphery of the second vent. The first fixing member and the second fixing member are mounted on opposite ends of the housing. The sealing member includes a sealing portion with an exhaust opening. The sealing member is received in the first and second vents, and resisting against the first fixing member. The exhaust opening communicates with the first and second vents. The elastic member is received in the third vent, and resisting between the second fixing member and the sealing member.

15 Claims, 5 Drawing Sheets

(71) Applicants: HON HAI PRECISION INDUSTRY CO., LTD., New Taipei (TW)

(58) Field of Classification Search
CPC .................. F16L 17/08; B25J 15/0616; B25J 15/0633; B25J 15/0641
USPC ........................................................ 285/95
See application file for complete search history.

(56) References Cited

U.S. PATENT DOCUMENTS

| | | | | |
|---|---|---|---|---|
| 2,804,317 A * | 8/1957 | Prater | ................... | F16K 17/18 137/68.14 |
| 3,749,122 A * | 7/1973 | Gold | ................... | F16K 15/063 137/515.7 |
| 4,605,039 A * | 8/1986 | Johnson | ................. | F16K 17/30 137/460 |
| 5,462,081 A * | 10/1995 | Perusek | ................. | F16K 17/30 137/498 |
| 2006/0265834 A1* | 11/2006 | Kim | ......................... | A47L 9/19 15/412 |
| 2008/0088127 A1* | 4/2008 | Tiberghien | ............. | F16L 37/42 285/95 |

* cited by examiner

CONNECTING STRUCTURE FOR VACUUM SYSTEM

BACKGROUND

1. Technical Field

The present disclosure relates to a connecting structure, and more particularly to a connecting structure for vacuum system.

2. Description of Related Art

In industrial production or manufacturing, it is always necessary to use a conveyer to convey a workpiece between work stations. A conventional conveyer includes a vacuum generator, a number of connecting structures, and a number of suction cups. The connecting structures are connected to each vacuum generator respectively, and the suction cups are used to suction onto the surface of the workpiece. Some of the workpieces may have an uneven surface, therefore, the suction cup will not suction to the surface of the workpiece tightly. When air leakage between the suction cup and the surface of the workpiece is greater than predetermined value, a large amount of air flows to the vacuum generator, as a result, the vacuum in the vacuum generator may be damaged or diminished, and the workpiece may not be held securely by the other suction cups.

Therefore, a connecting structure that maintains a strong vacuum state in the vacuum generator is needed.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
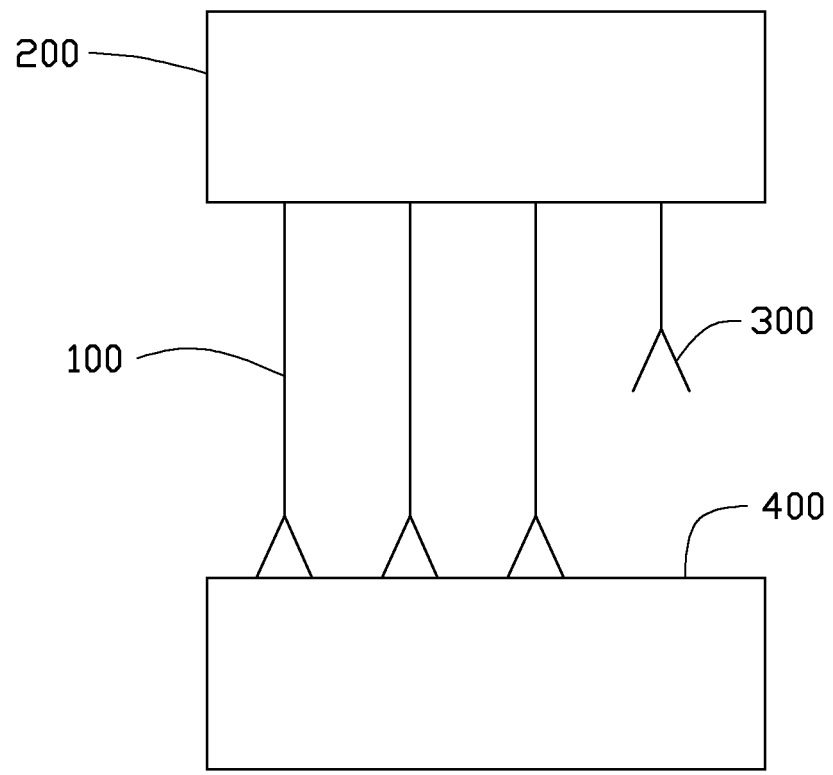
FIG. 1 is a schematic view of a connecting structure according to a first embodiment of the present disclosure when in usage.
Figure 2:
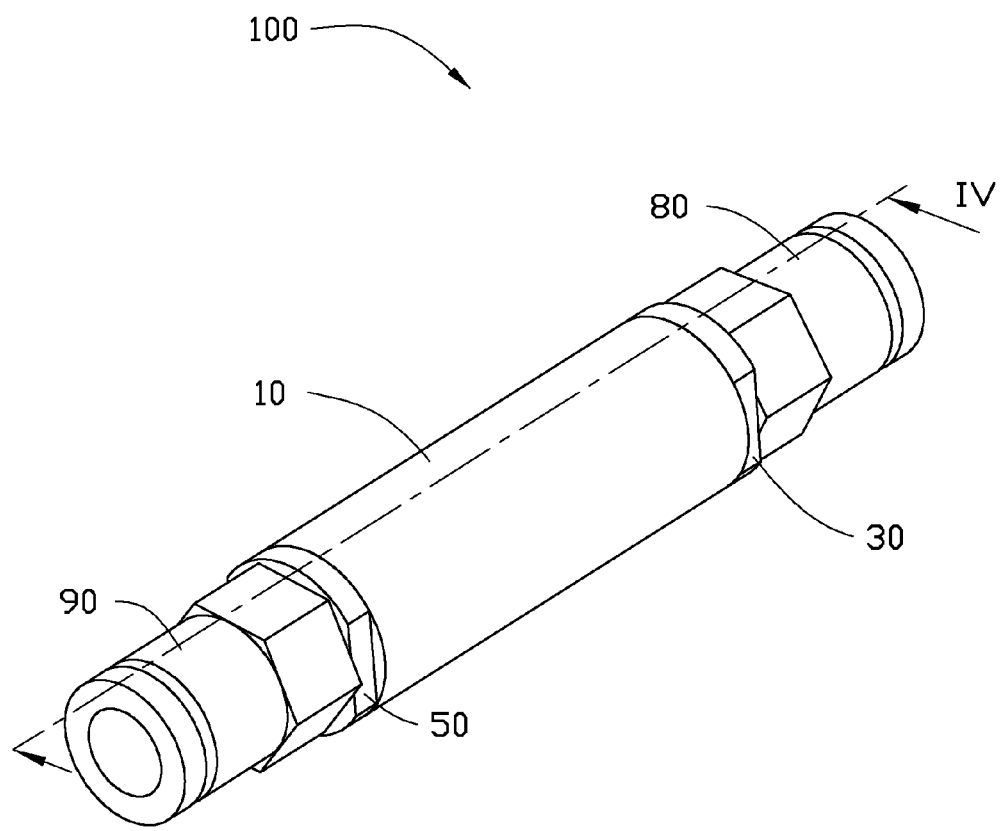
FIG. 2 is an isometric view of the connecting structure in FIG. 1.
Figure 3:
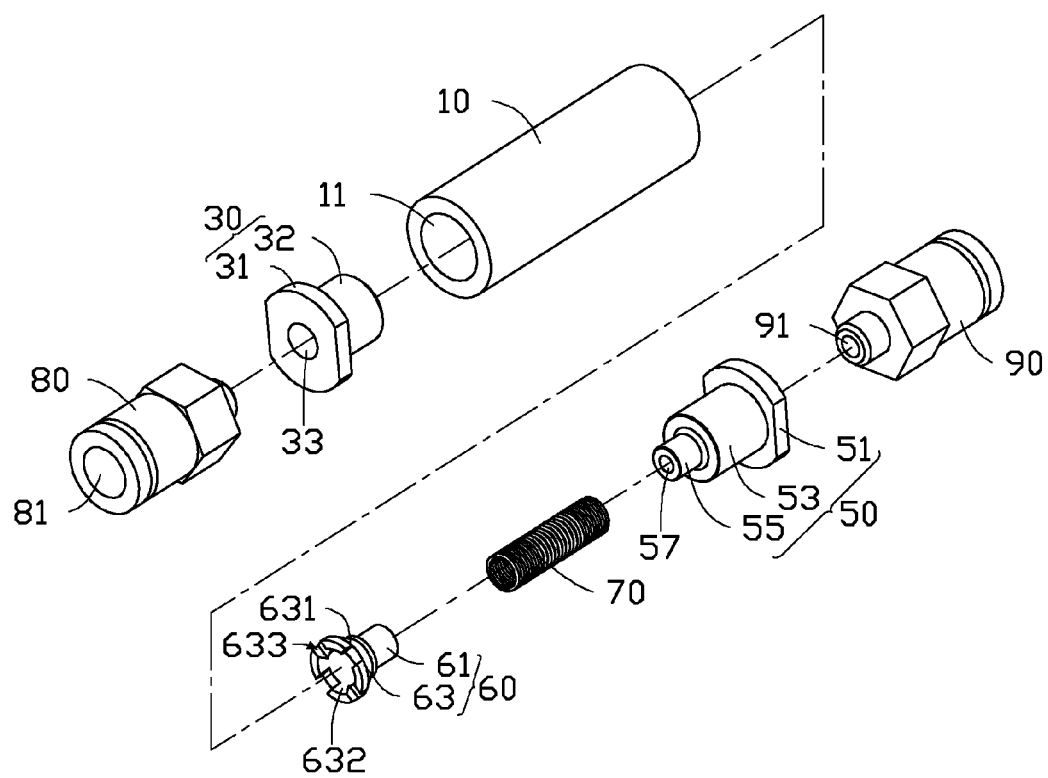
FIG. 3 is an exploded view of the connecting structure in FIG. 2.
Figure 4:
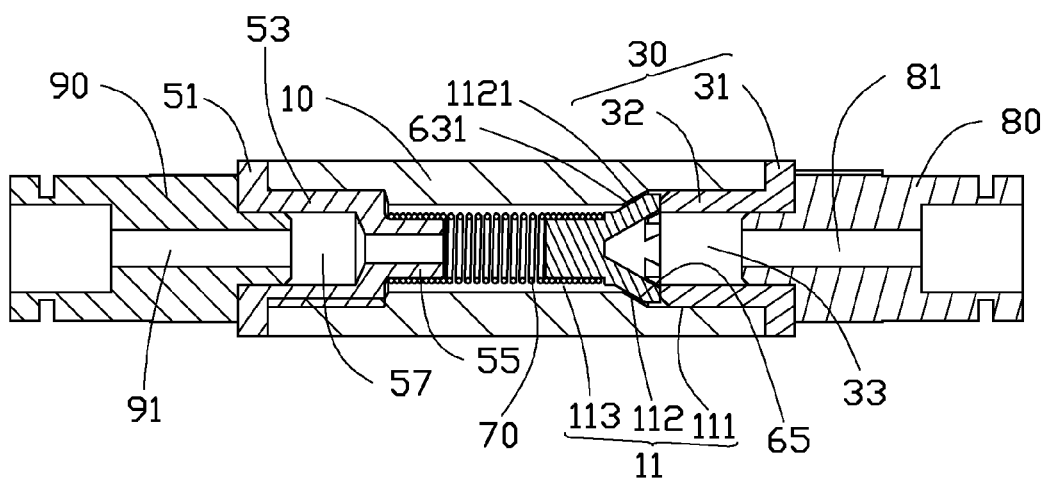
FIG. 4 is a sectional view taken along line IV-IV of the connecting structure in FIG. 2.

FIG. 1 is a schematic view of a connecting structure according to a first embodiment of the present disclosure when in usage. One end of the connecting structure 100 is connected to a vacuum generator 200 via a connecting pipe (not shown), and the other end of the connecting structure 100 is connected to a suction cup 300 which is configured for suctioning to a workpiece 400. Referring to FIGS. 2-4, the connecting structure 100 of the first embodiment includes a cylindrical housing 10, a first fixing member 30, a second fixing member 50, a sealing member 60, and an elastic member 70. The first fixing member 30 is mounted on one end of the housing 10, and the second fixing member 50 is mounted on the other end of the housing 10. The sealing member 60 is movably mounted in the housing 10, and resists against to one end of the first fixing member 30. The elastic member 70 is mounted in the housing 10, and the two ends of the elastic member 70 elastically resist against the second fixing member 50 and the sealing member 60, respectively.

FIG. 2 is an isometric view of the connecting structure 100 in FIG. 1, FIG. 3 is an exploded view of the connecting structure 100, and FIG. 4 is a sectional view of the connecting structure 100 in FIG. 2. A stepped hole 11 is defined in the housing 10, and includes a first vent 111, a second vent 112, and a third vent 113 communicating with each other. In the present disclosure, a diameter of the first vent 111 is larger than a diameter of the second vent 112, and a diameter of the second vent 112 is larger than a diameter of the third vent 113. The second vent 112 is a conical hole, with the diameter of the second vent 112 gradually decreasing from the first vent 111 toward the third vent 113, thereby forming an inclined resisting surface 1121 on an inner surface of the second vent 112.

The first fixing member 30 is mounted on the end of the housing 10 near the first vent 111, and includes a first main body 31 and a resisting portion 32 protruding from the first main body 31. The first main body 31 and the resisting portion 32 define a first through hole 33 communicating with the stepped hole 11. The first main body 31 resists against the end of the housing 10 near the first vent 111. The resisting portion 32 is received in the first vent 111, and adjacent to the resisting surface 1121.

The second fixing member 50 is mounted in the end of the housing 10 near the third vent 113. The second fixing member 50 includes a second main body 51, a fixing portion 53 protruding from one end of the second main body 51, and a sleeve portion 55 protruding from the fixing portion 53 away from the second main body 51. The second fixing member 50 includes a second through hole 57 passing through the second main body 51, the fixing portion 53, and the sleeve portion 55. The second through hole 57 communicates with the first through hole 33 and the stepped hole 11. The second main body 51 resists against one end of the housing 10 near the third vent 113. The fixing portion 53 is received in the end of the third vent 113 away from the first vent 111, and the sleeve portion 55 is received in the third vent 113.

The sealing member 60 is movably mounted in the stepped hole 11. The sealing member 60 includes a sleeve 61 and a sealing portion 63 protruding from the sleeve 61. The sleeve 61 is cylindrical shaped, and movably received in the third vent 113 of the housing 10. The sealing portion 63 is movably received in the first vent 111 and the second vent 112, and is hollow circle plate shape. The peripheral surface of the sealing portion 63 is an abutting surface 631 matching with the resisting surface 1121 of the stepped hole 11. The abutting surface 631 is gradually inclined to the axis of the sealing portion 63 toward the sleeve 61. A plurality of abutting portions 632 are formed at intervals on a peripheral portion of an end surface of the sealing portion 63 towards the first fixing member 30. An exhaust opening 633 is positioned between two adjacent abutting portions 632. A diameter of the end of the sealing portion 63 near the resisting portion 32 is smaller than an internal diameter of the first vent 111.

The elastic member 70 is mounted in the third vent 113. One end of the elastic member 70 resists against the sleeve portion 55 of the second fixing member 50, and the other end of the elastic member 70 resists against the sleeve 61 of the sealing member 60. Therefore, the end of the abutting portion 632 of the sealing member 60 away from the sleeve 61 resists against the resisting portion 32 of the first fixing member 30, and the abutting surface 631 and the resisting surface 1121 define a ventilation gap 65 communicating with the exhaust opening 633 of the sealing member 60.

In this embodiment, the connecting structure 100 further includes a first connecting member 80 and a second connecting member 90. The first connecting member 80 is fixed on the first main body 31 of the first fixing member 30. One end of the first connecting member 80 away from the first fixing member 30 is connected with the suction cup 300. The first connecting member 80 defines a first air intake 81 communicating with the first through hole 33. The second fixing member 90 is fixedly mounted on the second main body 51 of the second fixing member 50. One end of the second connecting member 90 away from the second fixing member 50 is connected with the vacuum generator 200. The second fixing member 90 defines a second air intake 91 communicating with the second through hole 57, thereby having the first air intake 81 and the second air intake 91 communicate with the stepped hole 11.

In assembly, the sleeve 61 of the sealing element 60 is threaded through the first vent 111, and received in the third vent 113. Then, the resisting portion 32 of the first fixing member 30 is received in the first vent 111, and the first main body 31 resists with the end of the housing 10 near the first vent 111. After that, the elastic member 70 is received in the third vent 113 with one end thereof elastically resisting against the sleeve 61 of the sealing member 60. Then, the fixing portion 53 of the second fixing member 50 is received in the third vent 113, and the sleeve portion 55 elastically resists against the other end of the elastic member 70 away from the sealing member 60. Finally, the first connecting member 80 is fixedly mounted on the first main body 31 of the first fixing member 30, and the second connecting member 90 is fixedly mounted on the second main body 51 of the second fixing member 50.

In use, the first connecting member 80 is connected with the suction cup 300, and the second connecting member 90 is connected with the vacuum generator 200. When the suction cup 300 suctions to the workpiece 400, there is no air leakage or the air leakage is less than the predetermined value is provided. The suction cup 300 suctions to the workpiece 400, at the same time as air flow returns to the vacuum generator 200 through the first air intake 81, the first through hole 33, the exhaust opening 633 of the sealing member 60, the ventilation gap 65, the third vent 113, the second through hole 57 and the second air intake 91, so that the vacuum generator 200 suctions the suction cup 300 to the workpiece 400. If one particular suction cup 300 does not tightly suction against the workpiece 400, the amount of the air leakage through that particular suction cup 300 will be larger than the predetermined value, and the vacuum generator 200 draws in a large amount of air from the one particular suction cup 300. During this time, the air pressure in the first vent 111, the first air intake 81 and the first through hole 33 is larger than the air pressure in the third vent 113, the second through hole 57 and the second air intake 91, resulting in the sealing portion 63 of the sealing member 60 being pressed. The sealing portion 63 is moved by compressing the elastic member 70. In addition, the abutting surface 631 and the resisting surface 1121 resists tightly to be plugging the ventilation gap 65 and sealing the third vent 113 to maintain a vacuum.

Figure 5:
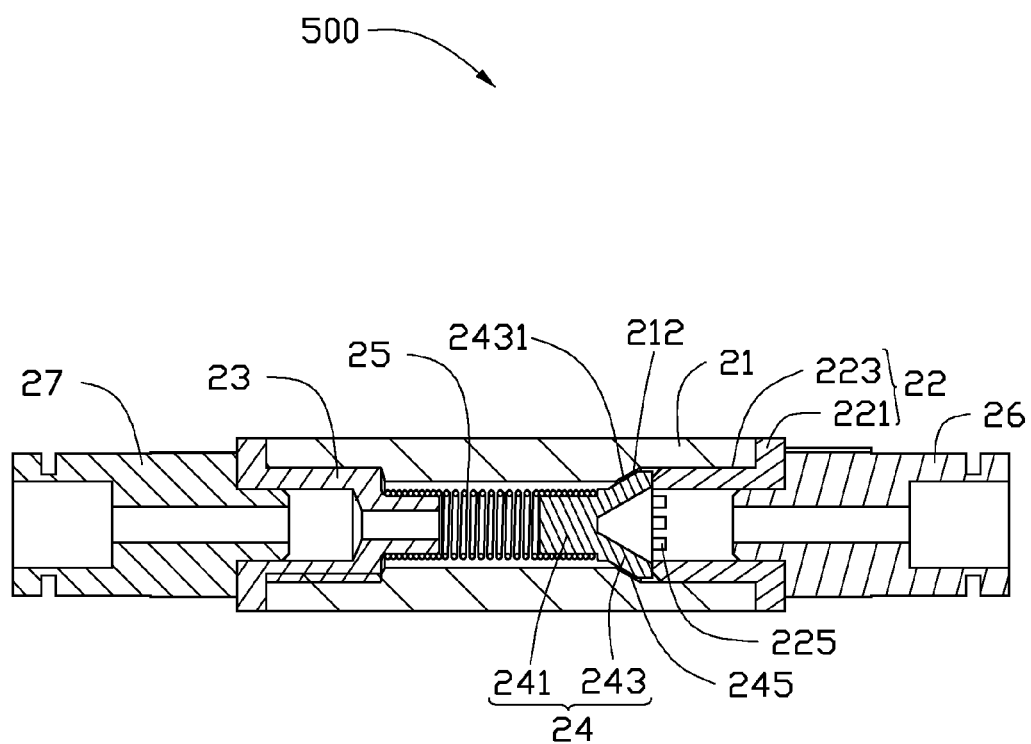
FIG. 5 is a sectional view of a connecting structure according to a second embodiment of the present disclosure.

FIG. 5 shows a connecting structure 500 according to a second embodiment. The connecting structure 500 is similar to the connecting structure 100, and inclukes a housing 21, a first fixing member 22, a second fixing member 23, a sealing member 24, an elastic member 25, a first connecting member 26, and a second connecting member 27. The first fixing member 22 and the sealing member 24 are different from that of the connecting structure 100. The first fixing member 22 includes a first main body 221 and a resisting portion 223. The periphery of an end surface of the resisting portion 223 away from the first main body 221 defines a plurality of air ports 225 spaced from each other. The sealing member 24 includes a sleeve 241 and a sealing portion 243. The sealing portion 243 of the sealing member 24 is shaped in a hollow circular plate. The sealing portion 243 includes an abutting surface 2431 towards the sleeve 241 inclining to the axis of the sealing portion 243.

The elastic member 25 is mounted in the housing 21, elastically resisting between the second fixing member 23 and the sleeve 241 of the sealing member 24. Therefore, the end of the sealing portion 243 of the sealing member 24 away from the sleeve 241 resists against the resisting portion 223 of the first fixing member 22, and a ventilation gap 245 is formed between the abutting surface 2431 of the sealing portion 243 and a resisting surface 212 of the housing 21. The air ports 225 communicate with the ventilation gap 245.

When the suction cup 300 resists against the workpiece 400, there is no air leakage or the air leakage is less than the predetermined value, and the air flows to the vacuum generator 200 through the exhaust opening 633. When the suction cup does not suction tightly to the workpiece 400 and the air leakage between the suction cup 300 and the workpiece 400 is greater than the predetermined value, the sealing member 60 is moved toward the housing 10 and compresses the elastic member 70. In addition, the abutting surface 631 of the sealing portion 63 tightly resists against the resisting surface 1121 of the stepped hole 11 of the housing 10, sealing the third vent 113. Therefore, the vacuum generator 200 maintains a sufficient amount of vacuum. Even if some of the suction cups 300 do not properly suction to the workpiece 400, and the air leakage is greater than the predetermined value, the third vent 113 and the vacuum generator 200 can still maintain a vacuum.

The first connecting member 80 and the second connecting member 90 can be omitted, the suction cup 300 is connected with the first fixing member 30 directly, and the vacuum generator 200 is connected with the second fixing member 50 directly.

It is to be understood that even though numerous characteristics and advantages of the present embodiments have been set forth in the foregoing description, with details of the structures and functions of the embodiments, the disclosure is illustrative only; and that changes may be in detail, especially in matters of shape, size, and arrangement of parts, within the principles of the embodiments, to the full extent indicated by the broad general meaning of the terms in which the appended claims are expressed.

What is claimed is:

1. A connecting structure, configured for connecting with a vacuum generator and at least one suction cup to suction on a workpiece, comprising:
   a housing, the housing being cylindrical in shape;
   a first fixing member connected with one end of the housing;
   a second fixing member connected with an other end of the housing;
   a sealing member; and
   an elastic member,
   wherein a stepped hole is defined in the housing, and includes a first vent, a second vent, and a third vent communicating with each other in that order; a diameter of the second vent is gradually decreased from the first vent toward the third vent, thereby forming a resisting surface on an inner surface of the second vent; the first fixing member is mounted on the end of the housing near the first vent, and is configured for connecting with the suction cup; the second fixing member is mounted on the other end of the housing near the third vent, and is configured for connecting with the vacuum generator; the sealing member comprises a sealing portion with an exhaust opening, and the sealing portion is received in the first vent and the second vent, and resisting against the first fixing member; the exhaust opening communicates with the first and second vents; the elastic member is received in the third vent, and resisting between the second fixing member and the sealing member to form a ventilation gap between the sealing portion of the sealing member and the resisting surface of the second vent, and the ventilation gap communicates with the exhaust opening of the sealing member; when air leakage between the suction cup and the workpiece is greater than a predetermined value, the sealing portion is pressed and moved by compressing the elastic member, thereby having the sealing portion and the resisting surface resisting tightly thereby plugging the ventilation gap and sealing the third vent; and wherein a plurality of abutting portions are formed at intervals on a peripheral portion of an end surface of the sealing portion towards the first fixing member, and the sealing portion resists against the first fixing member by the abutting portions thereof; the exhaust opening is formed between two adjacent abutting portions.

2. The connecting structure of claim 1, wherein the sealing portion is shaped in a hollow circular plate and the outer surface of the sealing portion is an abutting surface matching with the resisting surface of the stepped hole; the ventilation gap is formed between the resisting surface of the housing and the abutting surface of the sealing portion.

3. The connecting structure of claim 2, wherein the sealing member further comprises a sleeve connected with the sealing portion; the sleeve is received in the third vent, and resists against one end of the elastic member away from the second fixing member.

4. The connecting structure of claim 1, wherein the first fixing member further comprises a first main body and a resisting portion protruding from one end of the first main body; the first fixing member defines a first through hole through the first main body and the resisting portion, and the first through hole communicates with the stepped hole; the first main body resists against the housing near the first vent; the resisting portion is received in the first vent, and the sealing member resists against one end of the sealing portion defining the exhaust opening.

5. The connecting structure of claim 1, wherein the second fixing member comprises a second main body, a fixing portion protruding from one end of the second main body, and a sleeve portion protruding from one end of the fixing portion away from the second main body; the second fixing member defines a second through hole through the second main body, the fixing portion and sleeve portion, and the second through hole communicates with the stepped hole; the second main body resists against one end of the housing near the third vent; the fixing portion is received in the third vent away from the first vent; the sleeve portion is received in the third vent and elastically resists against one end of the elastic member away from the sealing member.

6. The connecting structure of claim 1, wherein the connecting structure further includes a first connecting member and a second connecting member; one end of the first connecting member is fixedly mounted on the first fixing member, and the other end of the first connecting member is connected with the suction cup, thereby having the first fixing member connected with the suction cup through the first connecting member; one end of the second connecting member is fixedly mounted on the end of the second fixing member away from the housing, the other end of the second connecting member is connected with the vacuum generator, thereby connecting the second fixing member with the vacuum generator through the second connecting member.

7. A connecting structure, configured for connecting with a vacuum generator and suction cups to suction on a workpiece, comprising:
   a housing which is cylindrical,
   a first fixing member connected with one end of the housing;
   a second fixing member connected with the other end of the housing;
   a sealing member; and
   an elastic member,
   wherein a stepped hole is defined in the housing, and includes a first vent, a second vent, and a third vent communicating with each other in that order; a diameter of the second vent is gradually decreased from the first vent toward the third vent, thereby forming a resisting surface on an inner surface of the second vent; the first fixing member is mounted on the end of the housing near the first vent, and is configured for connecting with the suction cup; the second fixing member is mounted on the end of the housing near the third vent, and is configured for connecting with the vacuum generator; the periphery of an end surface of first fixing member adjacent to the second vent defines a plurality of air ports spaced from each other, and the air ports communicates with the stepped hole; the second fixing member is mounted on the end of the housing adjacent to the third vent to connect with the vacuum generator; the sealing member comprises a sealing portion received in the first vent and the second vent, and the sealing portion resists against the first fixing member; the elastic member is received in the third vent, and resists between the second fixing member and the sealing member to form a ventilation gap between the sealing portion and the resisting surface, and the ventilation gap communicates with the air ports; when air leakage between the suction cup and the workpiece is greater than a predetermined value, the sealing portion is pressed and moved by compressing the elastic member, thereby having the sealing portion and the resisting surface resisting tightly to be plugging the ventilation gap and sealing the third vent.

8. The connecting structure of claim 7, wherein the sealing portion is hollow circle plate shaped, an outer surface of the sealing portion is an abutting surface matching with the resisting surface, and the ventilation gap is formed between the abutting surface and the resisting surface.

9. The connecting structure of claim 7, wherein a diameter of the sealing portion near the first fixing portion is smaller than an internal diameter of the first vent.

10. A connecting structure, configured for connecting with a vacuum generator and at least one suction cup to suction on a workpiece, comprising:
   a housing, the housing being cylindrical in shape;
   a first fixing member connected with one end of the housing;

a second fixing member connected with an other end of the housing;
a sealing member; and
an elastic member,
wherein a stepped hole is defined in the housing, and includes a first vent, a second vent, and a third vent communicating with each other in that order; a diameter of the second vent is gradually decreased from the first vent toward the third vent, thereby forming a resisting surface on an inner surface of the second vent; the first fixing member is mounted on the end of the housing near the first vent, and is configured for connecting with the suction cup; the second fixing member is mounted on the other end of the housing near the third vent, and is configured for connecting with the vacuum generator; the sealing member comprises a sealing portion with an exhaust opening, and the sealing portion is received in the first vent and the second vent, and resisting against the first fixing member; the exhaust opening communicates with the first and second vents; the elastic member is received in the third vent, and resisting between the second fixing member and the sealing member to form a ventilation gap between the sealing portion of the sealing member and the resisting surface of the second vent, and the ventilation gap communicates with the exhaust opening of the sealing member; when air leakage between the suction cup and the workpiece is greater than a predetermined value, the sealing portion is pressed and moved by compressing the elastic member, thereby having the sealing portion and the resisting surface resisting tightly thereby plugging the ventilation gap and sealing the third vent; and
wherein the first fixing member further comprises a first main body and a resisting portion protruding from one end of the first main body; the first fixing member defines a first through hole through the first main body and the resisting portion, and the first through hole communicates with the stepped hole; the first main body resists against the housing near the first vent; the resisting portion is received in the first vent, and the sealing member resists against one end of the sealing portion defining the exhaust opening.

11. The connecting structure of claim 10, wherein the sealing portion is shaped in a hollow circular plate and the outer surface of the sealing portion is an abutting surface matching with the resisting surface of the stepped hole; the ventilation gap is formed between the resisting surface of the housing and the abutting surface of the sealing portion.

12. The connecting structure of claim 11, wherein a plurality of abutting portions are formed at intervals on a peripheral portion of an end surface of the sealing portion towards the first fixing member, and the sealing portion resists against the first fixing member by the abutting portions thereof; the exhaust opening is formed between two adjacent abutting portions.

13. The connecting structure of claim 11, wherein the sealing member further comprises a sleeve connected with the sealing portion; the sleeve is received in the third vent, and resists against one end of the elastic member away from the second fixing member.

14. The connecting structure of claim 10, wherein the second fixing member comprises a second main body, a fixing portion protruding from one end of the second main body, and a sleeve portion protruding from one end of the fixing portion away from the second main body; the second fixing member defines a second through hole through the second main body, the fixing portion and sleeve portion, and the second through hole communicates with the stepped hole; the second main body resists against one end of the housing near the third vent; the fixing portion is received in the third vent away from the first vent; the sleeve portion is received in the third vent and elastically resists against one end of the elastic member away from the sealing member.

15. The connecting structure of claim 10, wherein the connecting structure further includes a first connecting member and a second connecting member; one end of the first connecting member is fixedly mounted on the first fixing member, and the other end of the first connecting member is connected with the suction cup, thereby having the first fixing member connected with the suction cup through the first connecting member; one end of the second connecting member is fixedly mounted on the end of the second fixing member away from the housing, the other end of the second connecting member is connected with the vacuum generator, thereby connecting the second fixing member with the vacuum generator through the second connecting member.

* * * * *